United States Patent [19]

Goodman

[11] Patent Number: 4,667,321

[45] Date of Patent: May 19, 1987

[54] INPUT-OUTPUT MULTIPLEXER-DEMULTIPLEXER COMMUNICATIONS CHANNEL

[75] Inventor: William R. Goodman, Palo Alto, Calif.

[73] Assignee: Tandem Computers Incorporated, Cupertino, Calif.

[21] Appl. No.: 551,278

[22] Filed: Nov. 14, 1983

[51] Int. Cl.[4] .............................. H04J 3/17; H04J 3/16
[52] U.S. Cl. .......................................... 370/80; 370/90
[58] Field of Search ....................... 370/80, 58, 66, 96, 370/81, 90

[56] References Cited

U.S. PATENT DOCUMENTS

| | | | |
|---|---|---|---|
| 3,997,727 | 12/1976 | Platts et al. ............................ | 370/58 |
| 4,020,290 | 4/1977 | Perna et al. ............................ | 370/58 |
| 4,071,701 | 1/1978 | Leijonhufvjd et al. ................ | 370/66 |
| 4,131,763 | 12/1978 | Hersohtal ............................. | 370/66 |
| 4,143,242 | 3/1979 | Horiki .................................... | 370/58 |

Primary Examiner—Douglas W. Olms
Assistant Examiner—Frank M. Scutch, III
Attorney, Agent, or Firm—Townsend and Townsend

[57] ABSTRACT

The disclosure relates to an input-output multiplexer demultiplexer communication channel which transfers data between a communications controller and a multiplicity of radially attached communications ports. Self-clocking serial bit-synchronous data is transferred on two opposing unidirectional data links between the communications controller and the communications channel. Serial bit-synchronous data is transferred between the communications channel and the communications ports. The communications channel uses one-bit-time response round-robin polling when the communications channel initiates transmissions from the communications ports. Data transmissions from the communications controller are multiplexed on-the-fly in the communications channel to one of the communications ports.

5 Claims, 4 Drawing Figures

DISABLE PORT IF:

BLOCK DOES NOT BEGIN WITH A FLAG CHARACTER
ADDRESS FOLLOWING THE FLAG IS NOT THE PORT'S OWN ADDRESS.
BLOCK IS A LONG BLOCK
BLOCK DOES NOT TERMINATE WITH A FLAG OR AN ABORT.

INPUT-OUTPUT MULTIPLEXER-DEMULTIPLEXER COMMUNICATIONS CHANNEL

BACKGROUND

The present invention relates to computer system communications. Computer systems use communications controllers to control the transfer of data to and from remote communications ports. A communications channel in computer systems is typically a data bus on which data is transferred bidirectionally between a communications controller and the communications ports. Each of the communications ports and the controller are connected to the data bus. The communications controller is used to communicate blocks of information to and from the communications ports. The blocks may be divided into a multiplicity of sub-blocks. The sub-blocks are transferred within data formats predetermined by the communications system.

The communications controller must poll the communications ports to recognize which one of the communications ports wants to send information or is ready to receive information. This is accomplished by interrogation and responsive data transfers. A block of information including an address of the port to be polled is transferred to the communications ports. The communications ports respond according to their status. Addressing one of the communications ports is accomplished by transferring address data along the data bus to the communications ports wherein the address is decoded. Interrogating and responding consumes time on the data bus. This disadvantage limits the transfer rate of raw data on the data bus. Additionally, the time required to perform addressing and status recognition increases the time required to complete a block transfer. The data bus architecture has this inherent time delay disadvantage.

The communications controller may not be able to disable a communications port when the communication port is malfunctioning. The entire data bus communications capability may become inoperative when a single communications port causes the bus to malfunction.

Additionally, the communications port might be sending erroneous data during a failure. The data bus transmits data without checking the validity of the data. Erroneous data may propagate to the controller. The data bus disadvantageously lacks the capability of disabling any of the failing communications ports.

SUMMARY

An object of the present invention is to improve the response time of a port. A single-bit-time response time is preferred. Another object of the present invention is to detect and disable defective ports.

A channel performs addressing on-the-fly. A port is routed a data stream as a block of data from the channel. The data stream includes the address of the port that is to receive the data stream. The channel senses the address and sends the data block to the addressed port. The ports are designed to receive data at the unilateral direction of the channel. The channel suspends the transfer from the port if the port is transmitting.

The channel performs automatic checking of various control characters which are included in the data stream. Character checking is a monitoring of the integrity of the data stream transferred through the channel. The channel has the ability to disable a port in the event of detecting a recognizable error.

The channel employs multiplexing and demultiplexing of data on two unidirectional lines from a communications controller to a multiplicity of ports. Transmit data, transmit clock, receive data and receive clock unidirectional lines are connected to each of the ports that are radially attached to the channel. These lines facilitate a one-bit-cell-time response time of the ports. The radial configuration enables a round-robin polling that is implemented in the channel. These and other advantages will become more apparent and understood in the description of a preferred embodiment.

DRAWING DESCRIPTION

PREFERRED EMBODIMENT

Figure 1:
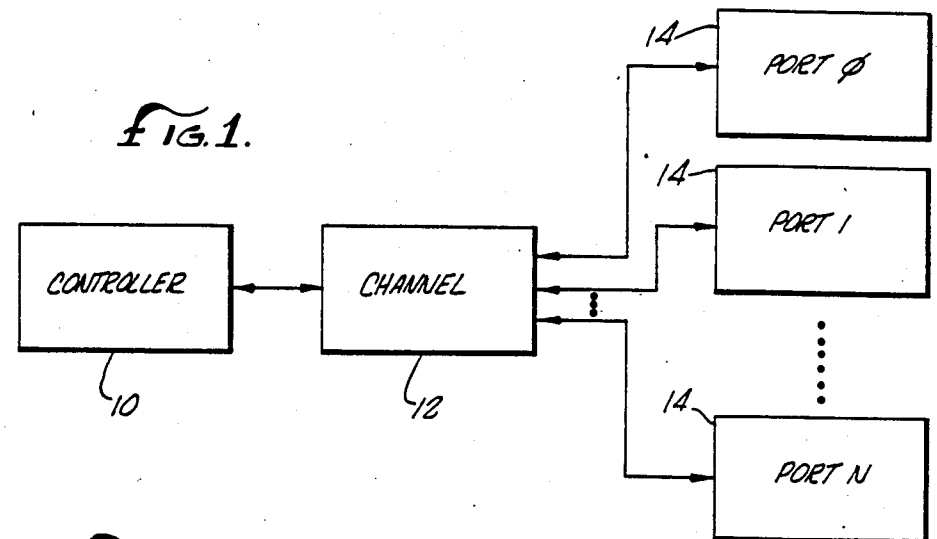
FIG. 1 depicts a channel connected to a controller and ports.

Referring to FIG. 1, a controller 10 is connected to a channel 12 which in turn is connected to a plurality of ports 14 which are connected in a radial configuration.

Figure 2:
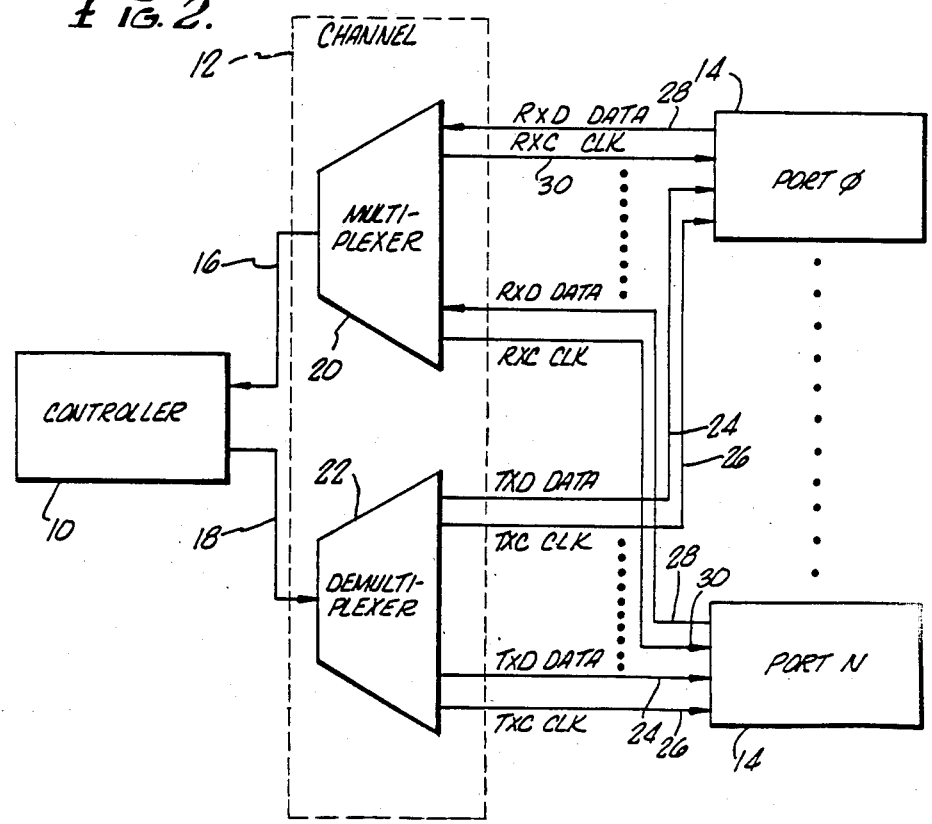
FIG. 2 depicts links connecting the channel to the controller and the ports.

Referring to FIG. 2, the controller 10 is connected to the channel 12 by the use of two unidirectional links 16 and 18 both of which communicate serial data. The channel 12 and controller 10 are connected together by the two serial links 16 and 18 which enable simultaneous bidirectional communications. The links 16 and 18 are serial self-clocking bit-synchronous unidirectional links. The channel 12 uses a multiplexer 20 and a demultiplexer 22. The link 16 communicates data from a multiplexer 20 to the controller 10 while the link 18 communicates data from the controller 10 to a demultiplexer 22. The multiplexer 20 multiplexes data from the ports 14 and transmits data to the controller 10. The demutiplexer 22 demutiplexes data from the controller 10 and transmits data to the ports 14.

Transmit data lines 24, transmit clock lines 26, receive data lines 28 and receive clock lines 30 communicate serial unidirectional data and all of which connect the channel 12 to the ports 14. The receive data lines 28 communicate receive data signals transmitted by the ports 14 to the multiplexer 20. The receive clock lines 30 communicate receive clocking signals that are transmitted by the multiplexer 20. The transmit data lines 24 and transmit clock lines 26 communicate respective transmit data and transmit clock signals that are transmitted by the demultiplexer 22.

Each of the ports 14 connects to one receive data line 28, receive clock line 30, transmit data line 24 and transmit clock line 26. The transmit clock lines 26 clock transmit data on their respective transmit data lines 24 into their respective ports 14. The receive clock lines 30 clock receive data on their respective receive data lines 28 out of their respective ports 14. Consequently, each of the ports 14 connects to two pairs of data and clocking lines.

The demultiplexer 22 monitors an incoming data stream from the controller 10 for the port address within the incoming data stream on line 18. The demultiplexer 22 then automatically routes the incoming data stream to an addressed port 14. This automatic routing is called on-the-fly addressing. It eliminates the need for block transfer to address a port 14. The demultiplexer 22 transmits the transmit clock signal synchronously with the transmit data. The transmit clock signal is carried simultaneously on all the transmit clock lines 26. The transmit data signal is transmitted on only one of the transmit data lines 24.

The multiplexer 20 uses round-robin polling to determine which of the ports 14 is ready to transmit data. The multiplexer 20 transmits a receive clock cycle on the receive clock line 30 to one of the ports 14. Then, the port presents a low signal on the receive data line 28 if the port is ready to transmit data. This low signal is a logic zero data bit which is the first bit of a block of data bits the port 14 will transmit. The port 14 presents a high signal on receive data line 28 if it is not ready to transmit data.

The multiplexer 20 then proceeds to the next port 14 if the present port asserts a high signal or the port has finished transmitting a block of data bits to determine if the next port 14 is ready to transmit data. The multiplexer 20 cyclically interrogates the ports 14. The multiplexer 20 will interrogate port zero after the last port (N) has been interrogated. This is called round-robin polling and this polling does not require the transfer of a block of data for addressing.

The port 14 must present a low signal during the interrogation clock cycle which is used to interrogate the port 14, if the port 14 is ready to transmit data. Consequently, the port 14 has one-bit-time response time to respond to the interrogation. This provides for fast cyclic polling and addressing of the ports 14.

The incoming data stream from the communication controller is self-clocking. The incoming data stream has its data and clock signals superimposed simultaneously on link 18. The demultiplexer 22 separates the data and clock signals and transmits the data of the incoming data stream to the addressed port 14. The separated clock signal is synchronized to the channel and transmitted to all the attached ports 14.

The multiplexer 20 internally generates the receive clock signal. The receive data signal coming into the multiplexer 20 from a particular port is combined with the multiplexer internally generated receive clock signal thereby forming an outgoing data stream which is self-clocking.

The demultiplexer 22 can communicate with only one of the ports 14 at a time. The multiplexer 20 can communicate with only one of the ports 14 at a time. The receive clock signal is sent to only one of the ports 14. The transmit clock signal is transmitted to all the ports 14 but, one of the ports 14 can receive a data stream while another one of the ports 14 is transmitting a data stream. Consequently, the channel can simultaneously transmit data to and receive data from the controller. This bidirectional communication occurs on the two unidirectional links 16 and 18.

The multiplexer 20 terminates the transmission of receive clocks to the addressed port when both the demultiplexer 22 and multiplexer 20 are simultaneously communicating with the same port 14. This causes the multiplexer 20 to stop its communications with the addressed port. Simultaneous transmit and receive communications to one of the ports 14 is thereby prohibited.

The data streams that flow through the demultiplexer 22 and multiplexer 20 are monitored by the demultiplexer 22 and multiplexer 20, respectively. The demultiplexer 22 and multiplexer 20 recognize a flag character which is the first and may be last valid character of a data block. The address character follows the first flag character. The address character identifies the addressed port 14.

The multiplexer 20 causes an apparent disabling of one of the ports 14 when a failure occurs during a transmission from that port. The four recognizable failure conditions are long data block, no begin flag character, no end flag or abort character and incorrect address.

Figure 3:
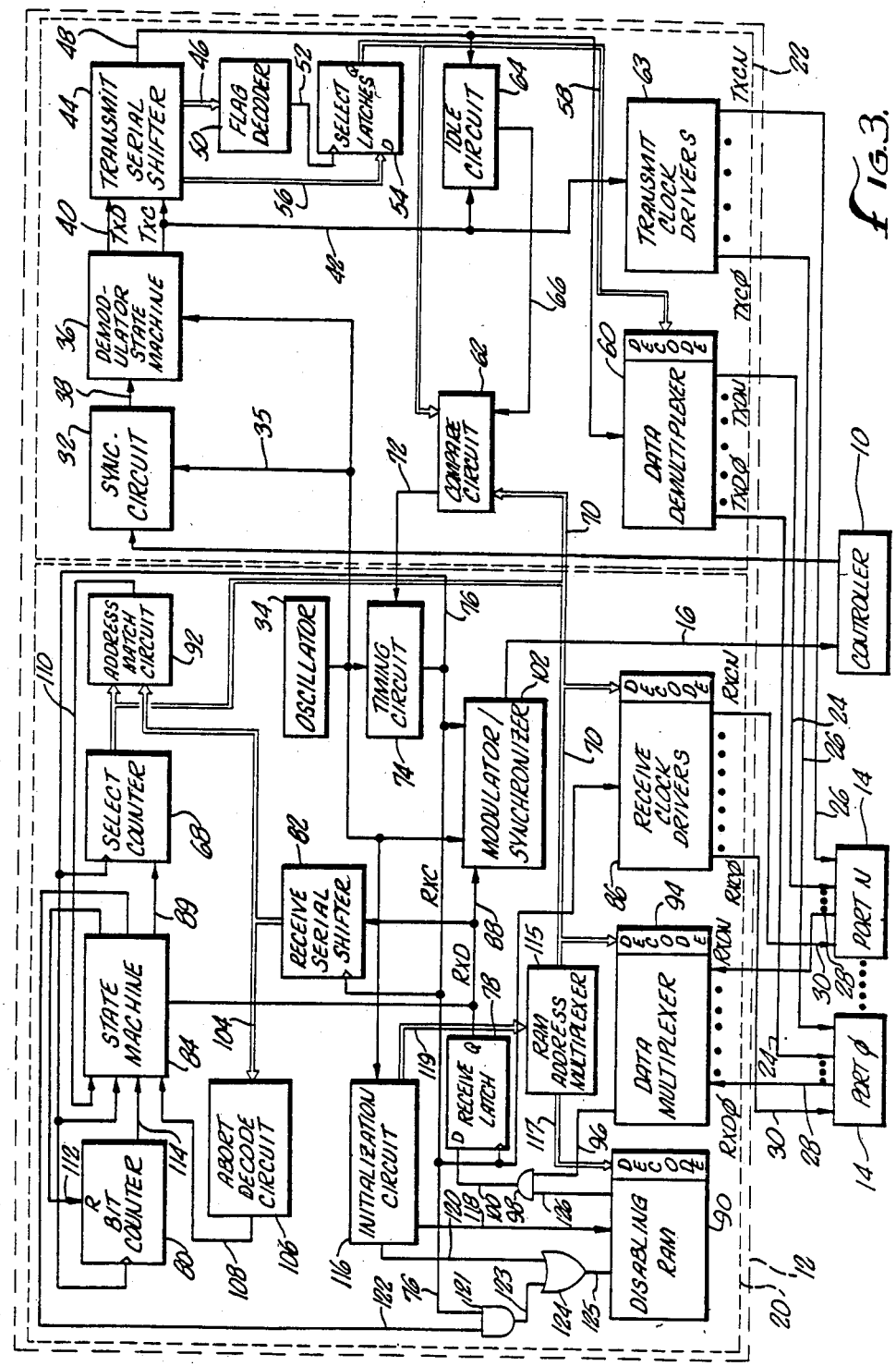
FIG. 3 is a detailed block diagram of the channel connected to the controller and the ports.

Referring to FIG. 3, transmit self-clocking data which is transmitted from the controller 10 to the demultiplexer 22, first enters a synchronization circuit 32. The synchronization circuit 32 synchronizes the incoming bit stream to an internal oscillator 34. The oscillator 34 provides a clock signal on an oscillator output line 35. The data stream then enters a demodulating state machine 36 after it has been synchronized to the oscillator 34.

The synchronized transmit data stream, which enters this modulator state machine 36, employs a predefined bit-cell-time duration for each of the bits of the data stream. The data line 38 is always at a high voltage state at the beginning of each bit cell. The data line 38 will go to a low voltage state within the bit cell depending upon the data bit value therein. The bit value can be either a one or a zero.

The coding of the data stream provides that an early switching to the low voltage state specifies a zero bit. The transition occurs at the thirty-three percent point of the bit cell. A late switching to the low voltage state specifies a one bit. This transition occurs at the sixty-seven percent point of the bit cell time. Therefore, a sampling at the fifty percent bit-cell center will determine if the bit in the bit cell is a one or a zero bit.

The demodulator state machine 36 determines if there is a zero or a one bit within the bit cell. The demodulator state machine 36 also separates the clock and data and provides separated outputs which are the NRZ (non-return-to-zero) transmit data signal on line 40 and the transmit clock signal on line 42. The demodulator state machine 36 uses combinatory logic and latches which are clocked by the oscillator 34.

The transmit serial shifter 44 provides parallel outputs on lines 46 for all the bits within the transmit serial shifter 44. The transmit serial shifter outputs on lines 46 are connected to a flag decoder circuit 50. The transmit data signal on line 40 is shifted across the transmit serial shifter 44 by the transmit clock signal on line 42. The last output of the transmit serial shifter 44 is also the transmit data signal and is asserted on line 48.

The flag decoder circuit 50 recognizes the bit pattern of the flag character. Then, the flag decoder circuit 50 provides an active signal on line 52, thereby storing data in select latches 54. The port address is stored in the select latches 54 as the flag character is recognized.

The transmit serial shifter 44 also has parallel outputs on lines 56 which are connected to the D inputs of the select latches 54. The select latches 54 store the address of the presently addressed port 14 which is connected to the demultiplexer 22. The select latches 54 have outputs on lines 58 which represent the value of the addressed port. The lines 58 are connected to a data demultiplexer 60 and a compare circuit 62.

The line 48 of the transmit serial shifter 44 drives the data demultiplexer 60. The data demultiplexer 60 transmits the data stream on line 48 to the addressed port 14. The lines 58 cause the routing of the data stream on line 48 to the addressed port 14 through the data demultiplexer 60. The transmit clock signal on line 42 provided by the demodulator state machine 36, drives the transmit clock drivers 63. The transmit clock drivers 63 transmit the transmit clock signal to all of the connected ports 14.

The idle circuit 64 monitors line 48 for the presence of a data stream pattern. The idle circuit 64 enables the compare circuit only when there is a data stream coming out of the transmit serial shifter 44 on line 48. The idle circuit 64 is driven by the transmit clock signal on line 42 which clock triggers its monitoring. The idle circuit 64 has an output signal on line 66 which represents whether or not the demultiplexer 22 is in a transmit or idle state.

The multiplexer 20 has a select counter 68 which stores the port address of the presently addressed port 14 which is connected to the multiplexer 20. The select counter 68 provides the port address of the multiplexer 20 on lines 70.

The compare circuit 62 compares the select latched port address on lines 58 and the select counter port address on lines 70. The compare circuit 62 provides a multiplexing disabling signal on line 72 when enabled by a non-idle signal on line 66 and when the multiplexer port address on lines 58 and the demultiplexer address on lines 70 are equal. The disabling signal on line 72 causes the multiplexer 20 to cease transmitting clocking signals to the addressed port. Consequently, the compare circuit 62 is used to prohibit multiplexer 20 and demultiplexer 22 from simultaneously communicating with the same port.

The oscillator 34 drives a timing circuit 74 which provides the receive clock signal on line 76. The timing circuit 74 is disabled by an active signal on line 72. The receive clock signal on line 76 clock-triggers a receive latch 78, a bit counter 80, a select counter 68, a receive serial shifter 82 and a state machine 84. Additionally, the receive clock signal on line 76 drives the receive clock drivers 86 which transmit the receive clock signal to one of the ports 14. Consequently, the multiplexer 20 operates in synchronization with the receive data stream transmitted by one of the ports 14.

The central control mechanism for the multiplexer 20 is the state machine 84. The multiplexer state machine flow diagram of FIG. 4 reflects the logical flow of the state machine 84. The state machine 84 monitors a NRZ data line 88 when the multiplexer 20 interrogates one of the ports 14. The data line 88 will go to a low voltage state when the addressed port is ready to transmit data. The state machine 84 increments the select counter 68 when a data latch output on line 88 remains high.

The state machine 84 presents an active signal on increment line 89 to increment the select counter 68. The select counter 68 is used to poll the ports 14 as the select counter 68 increments. The select counter 68 presents the port address on lines 70. The address lines 70 are indirectly received by a RAM (random access memory) 90, an address match circuit 92, a data multiplexer 94 and a receive clock drivers 86. The receive clock drivers 86 sequentially present a clock cycle to each of the ports 14 on their respective clock lines 30 as the select counter 68 is incremented. This sequential scanning implements the round-robin polling.

Each of the ports 14 has one clock cycle of timing circuit 74 to present a low voltage state to the data multiplexer 94. The data multiplexer 94 decodes the port address on select lines 70. The data multiplexer 94 routes the data transmitted by the addressed port on link 28 onto a line 96.

The data on line 96 is routed through a disabling gate 98 on to a gate output line 100 which is connected to the D input of the receive latch 78. The receive latch output signal on line 88 is presented to the state machine 84, the receive serial shifter 82 and a modulator-clock-encoder circuit 102. The state machine 84 monitors line 88 and determines if the addressed port is ready to transmit data.

The modulator-clock-encoder circuit 102 receives NRZ data streams on line 88 and modulates the NRZ data streams dependent on data content. The modulator-clock-encoder circuit 102 receives the oscillator signal on line 35, the received data signal on line 88 and the receive clock signal on line 76 to perform modulation and encoding of the NRZ data streams. The resulting outgoing data streams are presented on link 16. Data is routed, in order, from one of the ports 14 through the data multiplexer 94, the disable gate 98, the modulator-clock-encoder circuit 102, to the controller 10 during data transmission.

The receive latch 78 is clocked by the timing circuit 74 thereby providing the NRZ (non-return-to-zero) data stream on line 88. This NRZ data stream is shifted through the receive serial shifter 82. The serial shifter 82 has parallel outputs on lines 104. The abort decode circuit 106 provides an active signal on the abort decode output line 108 when the abort character is presented by the receive serial shifter 82. The abort decode output line 108 is monitored by the state machine 84.

An address match circuit 92 receives the port address on lines 70 and the receive serial shifter outputs on lines 104. The matched output signal on line 110 is monitored by the state machine 84. The state machine 84 monitors the matched output signal on line 110 when the address character transmitted by one of the ports 14 is stored in the receive serial shifter 82.

The state machine 84 can reset the bit counter 80 by presenting an active reset signal on reset line 112. The bit counter 80 is reset at the beginning of a data stream transmission from one of the ports 14. The clock signal on line 76 causes the bit counter 80 to increment as the bits are transferred through the multiplexer 20. The bit counter 80 presents an active long block signal on line 114 which is monitored by the state machine 84, when the bit count of a block exceeds the maximum block bit count allowed. The state machine 84 monitors the long block signal on line 114 during a block transmission.

The state machine 84 has the ability to cause the apparent disabling of a port. The RAM 90 has a bit for each of the ports 14 connected to the channel 12 and the RAM 90 is selected by a RAM address multiplexer 115.

All the bits of the RAM 90 are set during an initialization period. An initialization circuit 116 provides for a power-on-reset signal line, not shown, that resets all the circuits in channel 12. The initialization circuit 116 receives the oscillator clock signal on line 35. The RAM 90 is selected by address lines 117 that are driven by the RAM address multiplexer 115. The initialization circuit 116 provides for set and reset signals on a line 118.

The initialization circuit 116 presents a set signal on line 118 after a power-on-reset of the channel 12. Then, the initialization circuit 116 presents control and address signals on lines 119 such that the RAM address multiplexer 115 selects a bit of the RAM 90 corresponding to the control and address signals on lines 119. Then, the initialization circuit 116 presents a write strobe signal on a line 120 that causes the setting of the addressed bit. The initialization circuit 116 sequentially sets all the bits of the RAM 90. Then, the initialization circuit 116 presents a reset signal after the initial setting of the bits of the RAM 90.

The receive clock signal on line 76 is used to strobe the RAM 90 during resetting. The line 76 is connected to an AND gate 121 that is used for strobing. The state machine 84 can reset the bits of the RAM 90 by presenting an active write signal on an enabling line 122. The state machine 84 can cause a strobe signal on a line 123 which is the output of the and gate 121. The line 123 is connected to an or gate 124 which has a write strobe output on a line 125. The line 125 is used to strobe the RAM 90 during all setting and resetting operations. Thus, the line 125 is controlled by the initialization circuit 116 during setting and controlled by the state machine 84 during resetting.

Each resetted bit stored in the RAM 90 corresponds to a disabled port. The output of the RAM 90 is presented on a RAM output line 126 which is connected to the disable gate 98. The disable gate 98 can cause the data stream on line 96 not to be presented on the disable gate output line 100. Consequently, the state machine 84 can cause the apparent disabling of a port 14 by resetting a corresponding bit in the RAM 90.

Figure 4:
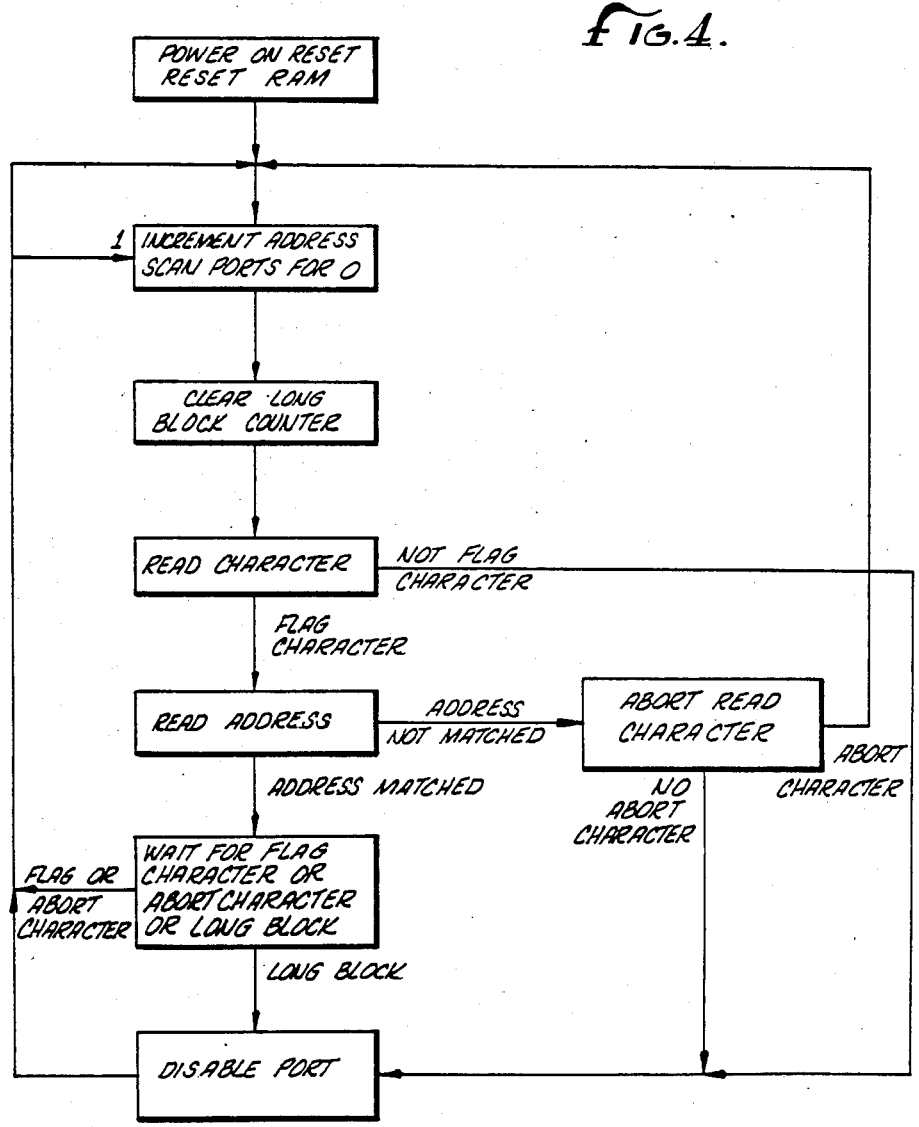
FIG. 4 is a flow chart depicting system operation.

The state machine 84 monitors the long block line 114, abort decode line 108, matched line 110 and data line 88 while it controls the increment line 89, bit counter reset line 112 and write line 120 to effectuate the operational flow depicted in FIG. 4.

What is claimed is:

1. A communication system for communicating blocks of data between controller means and a plurality of port means, comprising,
    demultiplexer means connected between said controller means and said port means for demultiplexing and communicating in whole each of a plurality of input blocks of data in each of which address data is used by said demultiplexer means to demultiplex each of said input blocks of data from said controller means to one of said port means specified by said address data of said input block of data when said input block of data enters said demultiplexer, and
    multiplexer means connected between said controller means and said port means for multiplexing and communicating in whole a plurality of output blocks of data from said port means each of which is sequentially monitored by said multiplexer means for one of said output blocks of data by sensing for a predetermined bit state of the first bit of each of said output block of data of which said first bit instructs said multiplexer means to either multiplex said output block of data from one of said port means to said controller means or proceed to monitor, in sequential order, another one of said port means.

2. The demultiplexer of claim 1, comprising,
synchronization-demodulation means connected to said controller means for synchronizing and demodulating data from said controller means,
transmit driver means connected to said synchronization-demodulation means for transmitting data clocking signals to said port means,
latch means connected to said synchronization-demodulation means and said data demultiplexer means for storing address data from said data from said controller means and for selecting one of said port means to which said data is demultiplexed,
said demultiplexer means including data demultiplexer means connected to said synchronization-demodulation means and said latch means for demultiplexing data in sync with said data clocking signals to one of a plurality of said port means,
compare circuit means connected to said data demultiplexer means, said latch means and said multiplexer means for determining if both said demultiplexer means and said multiplexer means are communicating to the same one of said port means and then for disabling the communication of said multiplexer means.

3. The multiplexer of claim 1, comprising,
said multiplexer means including data multiplexer for multiplexing data from one of a plurality of said port means,
receive driver means connected to said port means for transmitting data clocking signals to one of said port means,
state machine means for controlling said multiplexer,
synchronization-modulation means connected to said controller means and said data multiplexer means for synchronizing and modulating data from one of said port means to said controller means, and
disabling memory means connected to said state machine means, said data multiplexer means and said synchronization-modulation means for disabling the transmission of data through said multiplexer means wherein said disabling memory means is controlled by said state machine which recognizes error conditions.

4. A communication system for communicating blocks of data between controller means and a plurality of port means, comprising,
    demultiplexer means connected between said controller means and said port means for demultiplexing and communicating in whole each of a plurality of input blocks of data in each of which address data is used by said demultiplexer means to demultiplex each of said input blocks of data from said controller means within approximately one bit time of its receipt to one of said port means specified by said address data of said input block of data when said input block of data enters said demultiplexer, and
    multiplexer means connected between said controller means and said port means for multiplexing and communicating in whole, each within approximately one bit time of its receipt, a plurality of output blocks of data from said port means each of which is sequentially monitored by said multiplexer means for one of said output blocks of data by sensing for a predetermined bit state of the first bit of each of said output blocks of data of which said first bit instructs said multiplexer means to either multiplex said output block of data from one of said port means to said controller means or proceed to monitor, in sequential order, another one of said port means.

5. A radial communication system for communicating blocks of data between controller means and a plurality of port means, comprising,
    demultiplexer means connected between said controller means and said port means for demultiplexing and communicating in whole each of a plurality of input blocks of data in each of which address data is used by said demultiplexer means to demultiplex each of said input blocks of data from said controller means to one of said port means specified by said address data of said input block of data when said input block of data enters said demultiplexer, and multiplexer means connected between said controller means and said port means for multiplexing and communicating in whole a plurality of output blocks of data from said port means each of which is sequentially monitored by said multiplexer means for one of said output blocks of data by sensing for a predetermined bit state of the first bit of each said output blocks of data of which said first bit instructs said multiplexer means to either multiplex said output block of data from one of said port means to said controller means or proceed to monitor, in sequential order, another one of said port means.

* * * * *